United States Patent
Siegrist et al.

[11] Patent Number: 5,911,924
[45] Date of Patent: Jun. 15, 1999

[54] PROCESS FOR INJECTION MOLDING MACHINE WITH ELECTRIC DRIVES

[75] Inventors: Ronald Siegrist, Oberuzwil; Bruno Stillhard, St. Gallen; Hugo Blöchlinger, Flawil, all of Switzerland

[73] Assignee: ProControl AG, Flawil, Switzerland

[21] Appl. No.: 08/756,590

[22] Filed: Nov. 27, 1996

Related U.S. Application Data

[63] Continuation of application No. 08/318,607, filed as application No. PCT/CH93/00251, Oct. 27, 1993, abandoned.

[30] Foreign Application Priority Data

Apr. 5, 1993 [CH] Switzerland .............................. 1036/93
Sep. 11, 1993 [CH] Switzerland .............................. 2733/93

[51] Int. Cl.$^6$ ............................................. B29C 45/77
[52] U.S. Cl. .................... 264/40.1; 264/40.5; 264/328.1; 425/145; 425/166; 364/475.05; 364/475.08
[58] Field of Search .................................. 264/40.1, 40.5, 264/40.7, 328.1; 425/135, 145, 149, 150, 155, 161, 162, 165, 166, 167; 364/475.02, 475.05, 475.08, 475.09; 164/155.5, 155.1, 457

[56] References Cited

U.S. PATENT DOCUMENTS

| | | | |
|---|---|---|---|
| 4,695,237 | 9/1987 | Inaba ....................................... | 264/40.7 |
| 4,753,588 | 6/1988 | Kiya ......................................... | 264/40.7 |
| 4,772,830 | 9/1988 | Kobari et al. ............................ | 264/40.3 |
| 4,816,196 | 3/1989 | Otake ...................................... | 264/40.7 |
| 4,841,208 | 6/1989 | Itoh ......................................... | 264/40.7 |
| 4,988,273 | 1/1991 | Faig et al. ............................... | 264/40.7 |
| 5,062,784 | 11/1991 | Inaba et al. ............................. | 264/40.7 |
| 5,110,522 | 5/1992 | Inaba et al. ............................. | 264/40.7 |
| 5,251,146 | 10/1993 | Neko et al. ............................. | 264/40.7 |
| 5,256,345 | 10/1993 | Yokota .................................... | 264/40.1 |
| 5,362,222 | 11/1994 | Faig et al. ............................... | 264/40.7 |
| 5,380,181 | 1/1995 | Hiraoka et al. ......................... | 264/40.7 |
| 5,417,558 | 5/1995 | Heindel et al. ......................... | 264/40.7 |

FOREIGN PATENT DOCUMENTS

| | | |
|---|---|---|
| 167631 | 1/1986 | European Pat. Off. . |
| 528040 | 2/1993 | European Pat. Off. . |
| 3-47726 | 2/1991 | Japan . |

*Primary Examiner*—Jill L. Heitbrink
*Attorney, Agent, or Firm*—Finnegan, Henderson, Farabow, Garrett & Dunner

[57] ABSTRACT

A method is disclosed for controlling an injection molding machine of the type having an injection screw drivable for axial movement within an extrusion cylinder by a drive-controlled servo motor through a mechanical transmission, to provide a filling phase, a dwell phase, and a plasticization phase, the servo motor having a velocity command signal input connection, and the molding machine having sensors for screw position and injection pressure. The method includes the steps of presetting desired values for at least one of the injection pressure and the screw position; sensing the respective one of the corresponding actual injection pressure and actual screw position; and transmitting non-zero velocity command signals to the drive-controlled servo motor during at least the plasticization phase, and preferably also the filling and dwell phases, to move the injection screw within the cylinder. The velocity command signals are calculated as a function of a deviation of the respective one of the actual injection pressure and the actual screw position from the respective preset desired value, preferably using a linear functional relation during small deviation values, and a non-linear functional relation for large deviation values, to improve stability.

10 Claims, 11 Drawing Sheets

PROCESS FOR INJECTION MOLDING MACHINE WITH ELECTRIC DRIVES

This application is a continuation of application Ser. No. 08/318,607 filed Jan. 7, 1995, now abandoned, which commenced the U.S. National Phase of International Application PCT/CH93/00251 filed Oct. 27, 1993.

TECHNICAL SPHERE

The invention relates to an injection molding machine and to a process for controlling injection molding in an injection molding machine that preferably has two or more axes, a data transmission system, and computer means, the injection screw being driven by an electric motor and being moved axially by mechanical translation.

BACKGROUND

Injection molding machines are used for producing moldings made, for example, of thermoplastic material. The raw material, the plastic pellets, is melted in a heating cylinder by means of a plasticizing screw and is extruded into a mold by axial or longitudinal travel of the plasticizing screw. The mold is the cavity of a tool that is usually in two parts and is pressed together with the closing force by a moving tool clamping plate and fixed tool clamping plate. For removing the molding, the moving mold half is driven into a mold-open position and the part is removed from the cavity by an ejector. This procedure is repeated cyclically. Movement of the tool and of the ejector is not a process-controlled movement as such and, for the sake of productivity, should be very rapid, in other words should be carried out in the minimum amount of time. All these non-process dependent movements are combined in the so-called dry cycle time. Typical dry cycle times of a modern injection molding machine having a closing force of 100 t and 1.4 to 2.9 seconds. The dry cycle time is one of the main factors limiting productivity.

Nowadays, injection molding machines are still usually driven hydraulically using oil. Hydraulic drives have the advantage of being able to convert energy easily in a controlled manner into linear movements and high forces (electric motor→pump→valve system hydraulic cylinder). The relatively poor overall efficiency, which is about 20 to 40% in the case of injection molding machines, depending on the load, is a drawback. The lost power is usually absorbed by oil and water coolers. Hydraulic apparatus using oil do have high noise levels. Leakages, present to a greater or lesser extent in all oil hydraulic apparatus, are a further problem. Hydraulic oils are based almost exclusively on mineral oils and are therefore a hazard for the environment. Although the period of use of the hydraulic oils can be several years in normal cases, the problem of disposal arises.

Injection molding machines that are driven by an electric servomotor have been proposed in recent years. They are distinguished by much lower energy consumption but could not generally be used worldwide. A mechanical design has to produce a linear movement from the rotating movement of the servomotor, for example, up to the injection molding machine. Experience with machine tools has revealed two methods of converting the rotational movement of an electric motor into a longitudinal movement: the threaded spindle and the toothed rack. In the case of completely electric injection molding machines, only the toggle lever can be considered as a basic concept for the clamping unit. This is due to the conversion of the engine torque into the closing force. A force ratio of up to a factor of 50 is possible, depending on the design of the toggle joint geometry. A ball spindle preceded by a gear, for example, serves for driving the cross head. Such machines are designed for a dry cycle time that is as short as possible. However, practical values do not yet attain the corresponding peak values of hydraulically driven machines.

During the carriage movement, it is necessary to control the nozzle contact force in particular. The key problem in injection molding is injection has to take place at a controlled velocity, at a high pressure, and at the correct time. The plasticizing screw can attain an injection pressure of up to 2,000 bar or higher. An important object is the precise positioning in particular of the plasticizing screw. During injection, the velocity of the screw has to be controlled during the filling phase. On the other hand, the dwell pressure phase necessitates a controlled injection pressure or dwell pressure. The corresponding actual value originates from one or more measuring devices. Contrary to expectation, however, it has not been possible hitherto with electric drives to control the actual critical phases maintaining accurate back pressure during plasticisation and adequately control the melt pressure during the pack and dwell pressure phases. A large number of proposals have been made in recent times. Attempts have been made to control the injected quantity (melt flow) and the injection pressure by using various detector pulses, for example, for positioning the spindle or the plasticizing screw (see EP PS No. 216 940, 217 963, 167 631, 249 641). With that system, the velocity or acceleration parameters are subjected to open- or closed-loop control, in particular by the closed- or open-loop control of the torque of the driving motor. Attempts have been made to smooth out all deviations or the resultant errors stepwise by a plurality of special correction procedures using an error register (EP-PS No. 280 734). Similarly to hydraulic control or motion models, this process is based on the driving torque for controlling the injection force or the injection pressure. From a physical point of view, a more or less direct connection between the torque signal to the drive (closed- and open-loop motor controller) and the resultant or attainable injection pressure.

However, the corresponding processes have great drawbacks. Open/closed loop force control can in fact be achieved only in principle via the analog motor current limiting input at the drives (electronic controller to the servomotor). However, the following marginal conditions stand in the way of more precise or exact force control according to predetermined set values:

Firstly: the static actual force is, among other things, substantially impaired by frictional forces which are difficult to anticipate. These distort the torque signal over the path beginning with torque conversion of the motor current via the gear to forces or pressures.

Secondly: in contrast to a hydraulic system, inertia forces have a much more serious effect, among other things, during the changeover from filling pressure to dwell pressure. Together with the resilient plastic melt in the injection cylinder, these moved masses form low frequency mass/spring resonators. This makes it difficult and often impossible to produce precise or thin-walled parts. The control of all parameters, for example, during injection and plasticisation but particularly in the transition phases from filling to the dwell pressure (pack) and from the dwell pressure to plasticisation, limits the quality of the injection molding.

The development in control in the past has gone through various phases. Until the late 80s, the use of a process computer that coordinated all functions as a control center and in particular, subjected all main functions to open- and closed-loop control, represented the highest state. This model was superseded by the so-called memory programmable controllers (SPS) to which, however, a process computer was allocated for more complex computer tasks. The SPS was allocated the control and locking functions, but sometimes also start programs, run-up programs etc, and the process computer took over the actual closed- and open-loop control function.

Servomotors have been used increasingly widely for some time, the motor-generated rotational movement being transmitted as such or being converted into a translational movement or being converted into a transitional movement if necessary. The main advantage with servomotors is that both the position and the velocity of the axis can be controlled according to predetermined set values by a so-called interpolator with surprisingly high precision via the checking of the electric field ($\phi$) and current control (I) or with corresponding moment control for the motor axis. A drawback, however, is that relatively complex intelligence which may be controlled only by specialized firms is required for the necessary control tasks. The structure for the open- and closed-loop control of the servomotors in the drive has to be made up with specially developed microelectronics owing to the corresponding complexity.

The structural unit comprising the velocity controller and, in particular, the current or torque actuator as well as the corresponding commutator function is described as a motor controller which, together with mains connection and various converters, represents an individual drive. It is important for the drive to have a current controller.

Nowadays, a complete machine controller, for example, for an electrically driven injection molding machining, usually has a so-called CNC controller and an interpolator arranged in the controller. The interpolator is a computer for the drive with considerably higher computing power. Depending on their function, the servomotors are distributed over the entire machine and are preferably designed as velocity and/or torque controllable electric motors. The drives may be combined as a group. Either frequencial or analog data transmission takes place, in particular for velocity control, from the interpolator via the necessary wiring to each drive. The corresponding signal is transmitted during analog transmission, for example in the form of a voltage having a value in the range of +/- (plus or minus) 10 volts.)

The actual drawback of this solution is that data transmission as such represents a problem area as signal lines, in particular for control tasks, have to be specially protected against interference fields. The very advantageous bus system cannot be used or can only be used to a very limited extent as the data transmission rate is no longer guaranteed with the bus system. Integration of the interpolator into the CNC controller is currently the best solution as it is acknowledged that the systems as a whole are exhausted to their power limit. A further increase in the controllability of the process could only be achieved with excessive use.

SUMMARY OF THE INVENTION

The object of the invention is accordingly to control the sequence of operations to an even greater extent so as also to allow substantial increases in power, for example, without losses of quality. Part of the object is also to improve the control of electrically controlled injection molding machines or the corresponding process, and, in particular, to eliminate the drawbacks of known solutions as far as possible and to achieve quite particularly high precision and reproducibility of all important parameters during injection molding so that even thin-walled parts can be produced with maximum precision, for example, cups with a wall thickness of 0.4 mm, in a very short cycle time.

The solution according to the invention is characterized in that a velocity command signal (resp. set position signal) to a drive is selected as command signal and, in particular, the injection pressure and preferably simultaneously the (set) position limitations are controlled or limited, particularly preferably non-linearly controlled as target values for the pressure (or dwell pressure) and/or plasticisation phase, by means of a velocity signal to the drive (as command signal) via the modulation in position of the rotor or of a resultant magnetic field of the electric servomotor. The target values (pressure and/or velocity) preferably are controlled as a function via the time or via the travel of the axial movement of the injection screw.

The invention has revealed that too much attention was paid to an analogy between hydraulics and electrics in the past. Error correction programs have not correctly considered that basic physical laws play a part between the electric system and the behavior of the entire machine, the injected (plastic) material, in particular. The inventor has recognized that the system of the electrically driven injection screw has the following properties:

The plastic melt is a resilient material which, like a spring, can be compressed by more than 20% at a pressure of up to over 2,000 bar. The fact that the entire plastic melt in the mold and in the injection cylinder behaves elastically has an even worse effect so the injection screw in the injection cylinder can make a stroke, for example, up to several centimeters, owing to the elasticity. The precise position of the injection screw is dependent on, among other things, the instantaneous pressure in the plastic melt. The pressure changes when the system oscillates. It has been recognized that the prior art solutions with an oscillation frequency of about 2.5 Hz react to variations of torque or set injection pressure values. This behavior represents a considerable problem area and complicates rapid and precise control of the injection pressure.

The mechanical transmission from the servomotor to the injection screw can, on the other hand, be assumed to be rigid incompressible body which merely follows the mechanical/geometric alternation.

The rotor and the mechanical transformation are real masses that are subjected to the mass moment of inertia, in particular the rotor as such representing a relatively small mass but embodying a principal moment of inertia from a dynamic point of view.

If the injection screw is controlled via the change of the driving moment of the servomotor, this can only take place according to the law: mass×acceleration, or the equation $$W = \frac{mv^2}{2}$$

(W=energy, v=velocity, m=mass). A change in the velocity of the mass or a great acceleration necessitates a corresponding force. The application of a force to the mechanical parts (via the motor torque) produces not only a force or a pressure on the injection molding machine but also pronounced oscillations which are uncontrollable in co-operation with other factors such as friction, etc. However, the frequency of the oscillation cannot be calculated in advance as it depends on the effective quantity of the injected material or melt, the specific tools, the quality of the plastics material, the temperature or the time, etc.

As, in the final analysis, the functional unit of the injection system with the mold and the mold holding elements of the injection molding machine as a whole represent a pronounced oscillating system, the statement of system control via an open- or closed-loop controller based on the driving torque is incorrect.

It is known that the position of the rotor can be controlled to a very great extent in servomotors, in particular in the preferably selected brushless servomotors, for example of the electronically commutated brushless motor type, trademark "Fastact". These types of drive or motor are distinguished by highly dynamic stiff velocity control or position control. The rotor in combination with the drive, can therefore be considered as a body which is fixed in a magnetic field which, owing to its relatively small mass and the availability of disproportionately high electromagnetic forces, can be considered as following the magnetic field almost simultaneously. The magnetic field and position of the rotor can be controlled with an extremely high sequence or a corresponding alternation so low-frequency oscillations of the system are prevented with the new invention. Changes of signal take place at a frequency to over 100 Hertz. A given progress reference curve can be followed rapidly and precisely. The entire corresponding processing trace can be subjected to almost complete open- and/or closed-loop control via almost effective control of the movement. Instead of alternating force pulses on a mass, movement pulses which eliminate the much lower frequency oscillations of the system are transmitted directly to the mechanical parts. The formerly used error corrections which were uncontrollable in the final analysis and had complex error registers can therefore be omitted. An adequate reserve of torque, which allows genuine control of the position, of the travel, and the velocity, is important in the new invention.

According to a further quite particularly advantageous idea of the invention, it is proposed that the injection pressure, the injection velocity, and the travel limitation be controlled or limited via the velocity signal to the drive by means of a multi-valve controller for maximum approximation to the set target values without exceeding them or without harmful excesses.

As known, conventional control engineering is based on linear behavior of the components (distance and associated controller). Building up on the secondary velocity controller in the drive, primary position control is designed as linear feedback of the set value/actual value deviation. As expected, appropriate tests on a clamp unit with conventional velocity and position control concepts led to a dry cycle time (according to Euromap 12) of about 2 seconds. A further partial aim of the invention was accordingly to come as close as possible to the theoretically possible time of 0.65 seconds.

It is particularly preferably proposed that, in the large signal range, the velocity command signal to the drive preferably be calculated with a parabola-like or root-like function of the desired or set value/actual value position deviation with the maximum intensification factor (Ks) for approximation to the maximum acceleration of the servomotor, particularly preferably by the formula:

$$\sqrt{|(\text{Set } S - \text{Actual } S)|} \times ks = \pm \text{command value}$$

Simultaneously or alternatively, however, the velocity/command signal to the drive can also be calculated in the large signal range with a parabola-like or root-like function of the set/actual deviation in pressure, preferably with the maximum intensification factor (Kp) for approximation to the maximum acceleration of the servomotor, particularly preferably by the formula:

$$\sqrt{|(\text{Set } P - \text{Actual } P)|} \times kp = \pm \text{command signal}$$

It is found that during pressure and/or position control in the large signal range with parabola-like dependency of the velocity on the difference in desired or set position, a (time) optimum movement function can be achieved. In other words, according to the invention, the set/actual deviation with the controller has to act in a parabola-like manner on the velocity command signal and not linearly as with conventional controllers. The corresponding difference can easily be displayed by means of an oscillogram of the velocity trace. In the prior art, the transient condition is exponential in the case of step response value. According to the new invention, a linear trace of the velocity over time with relatively high gradients usually appears during steps in set pressure value. The set/actual difference in the position deviation from the target is intensified in a parabolic form in the invention and is transmitted to the appropriate drive, for example as a velocity command signal. It has also been found and can also be proven experimentally under certain marginal conditions that the same applies during pressure control if one exchanges the set position signal with the set pressure signal and accordingly the actual signals. The reason is that there is a direct linear function between travel difference and corresponding pressure difference in the static case. With 1,000 kN IMM, the static system pressure rate is about 200 (bar/mm) in the front screw region and decreases to about ⅓ of this value in the rear region. To enable the same parameters to be used for position and pressure control, the pressure difference is preferably adapted by a scale factor (Kp). Furthermore, an intensification factor (K1 or K2, FIG. 9) can be performed unsymmetrically, in particular in the large signal range, to optimize the injection process in order to make use of the higher angular deceleration under load.

A further quite particularly advantageous embodiment is characterized in that the velocity command signal to the drive is calculated as a substantially linear function of the set/actual deviation in the small signal range for achieving stability.

The electrical motor drive is preferably produced, for example, via a permanently excited servomotor or with a controlled asynchronous motor (for example cage rotor) or a controlled direct-current motor (DC-motor).

The new invention allows a number of quite particularly advantageous further embodiments. In one advantageous embodiment, pressure limiting values or pressure command values are additionally predetermined over time and/or over travel, the actual pressure value or a value correlative thereto being measured and being used for control or for the correction thereof. It is also proposed that the injection velocity be controlled or limited as a further target value during the injection phase, in particular during the filling phase. It is advantageous to predetermine the set value for at least one of the target values as a constant value or as a function of time or travel. The target values are preferably controlled or limited in the manner of a cascade by means of digital computers (in software). According to a further embodiment, the volume or the mass (melt) flow (m) of the plastics material flowing through the feed nozzle is controlled or limited as a target value during the injection phase and is calculated in particular from the predetermined values: pressure gradient, screw velocity and position, screw diameter, material constants (from pVT diagram) etc. The axial displacement force on the injection screw can also be measured, and compared to a set force trace over time and/or over the travel and can be used to correct the velocity signal. It is quite particularly advantageous to detect the deviations of the actual pressure and/or force trace with respect to a predetermined velocity trace and to check or correct them using a digital controller. Position control can be superimposed on the pressure or force control, in particular to avoid collisions with mechanical stroke limits.

A further advantageous embodiment is characterized in that the mass flow (material or melt) (m) through the feed nozzle is superimposed or applied as a function of pressure to control by means of disturbance compensation, for maximum approximation between the injection pressure and the set value even at relatively high injection velocities.

A further process according to the invention is characterized in that the sequence of operation is defined in the machine computer and the corresponding values, and in particular set values, are predetermined and transferred via the data transmission system to a program memory of a drive intelligence which subjects the individual axes to open- or closed-loop control in a coordinated manner.

The inventors have recognized that the prior art has been based on an incorrect model in at least two central points, as demonstrated, for example, by the model of the spatial movement of a robot. A robot normally moves in all three spatial directions. The former statement was based on the fact that the resultant movement of the gripper is controlled by the robot when each partial movement in each of the three spatial directions (in the case of three axes) is controlled. The computer merely needed to be fast enough, and the commands transmitted correctly to each drive. Provided that the calculation of the spatial curve was sufficiently accurate it was assumed that the result would have to comply by 100% so to speak. Unfortunately, however, this is not the case in practice. Varying moments of inertia, frictional forces, and other resistances etc. occur and attempts have been made to eliminate them with extremely large error correction programs. However, this was only partially successful.

The first erroneous statement was due to the fact that the problem was considered three dimensionally and then simply broken down or reduced into the three dimensions. However, the problem is in fact more than three dimensional as, for example, the time over velocity changes acts as if a fourth dimension were present. Therefore, the mathematical statement built up only on the three spatial dimensions is incorrect.

The second erroneous statement was that the factor of the reciprocal influencing of the three spatial movements is very great if friction, changing inertia forces, varying velocities etc. are present. Even the best mathematical statement can in the final analysis only be a rough approximation which cannot be demonstrated in individual cases by a relatively broad band of non-logical functions or deviations. Even an extreme increase in computing power does not solve these problems.

The inventors have now recognized that the only solution is to carry out the intervention, in particular the correction intervention, as close as possible to the location of occurrence similar to optimized robot control in a coordinated manner. Direct cooperation in motor control intelligence or drive intelligence of the open- and closed-loop control functions to be harmonized directly must take place. This means that a common interpolator must be allocated directly to each group of drives so that field control (commutation) as well as current, position, and velocity control are coordinated by each drive almost simultaneously. The specific design of the inner servomotor controller counteracts this as the position of the axis is almost identical to the position of the electric field in the servomotor. The corresponding almost rigid rotor control allows, with direct feedback from each axis, genuine and direct position control according to a set curve to be carried out with maximum precision and almost simultaneously. However, the location where an intervention as been made according to the invention in order to correct real deviations immediately for all axes in a coordinated manner is also here.

The invention allows for a considerable number of particularly advantageous embodiments. In a preferred embodiment, the values are transferred as complete recipes with set value inputs or set value curves for a specific operating sequence or operating cycle of the drive intelligence, the individual axes being synchronized by the drive intelligence. The position of at least one or of all axes is also controlled, for example, according to a set track curve and preferably also the velocity and/or the power consumption.

The invention also relates to a controller for two, and in particular for three or more axes, with corresponding motor controllers and is characterized in that a multi-axis drive, preferably as a hardware unit, has a program memory with a drive computer in addition to the motor controllers as a functional unit. The operating sequence of a group of individual axes is adapted for open- and/or closed-loop control in a coordinated manner by the drive computer. The motor controller is responsible for basic control with fixed set value inputs and the drive computer is responsible for the specific operating sequences. It is genuine and simultaneous co-operation for all controllers as the spatial distance, but in particular disadvantageous data transmission, for example via a bus for the control function, is omitted for this purpose. The multiple axis drive is advantageously designed as an integrated control unit with integrated program memory and drive computer with digital signal processing and has one or more position controllers as well as an interpolator for the multi-axial synchronization of movement and/or track curves. The multiple axis drive is advantageously designed to be connected via a data bus preferably a sensor/actor bus interface or can bus to a primary machine computer memory. An electrical driven injection molding machine can accordingly have one or, for example, two multiple axis drives, the multiple axis drive or drives being connectable to a data bus, preferably a sensor/actor bus interface to primary computer means for the injection molding machine. The data bus is no longer overloaded with control signals which have to be updated in high frequency. The primary computer means has storage means for the storage of all value curves and programs, including for example for the start enable and sequence control and control of the other machine functions.

A further very advantageous use for the new invention is the driving of similar machines, and in particular of robots, with preferably at least a part of all operating axes of the rotor being controllable by drive intelligence.

The invention also relates to an injection molding machine with an electric drive, in particular for the injection screw, which is drivable via a drive and mechanical transmission means for axial displacement, and is characterized in that the drive is controllable by control electronics via a velocity input (and a motor position feedback or input for the position or a position profile) to which a digital computer is allocated for cascade-like control or limitation of target values, and in particular the injection molding process.

According to a preferred embodiment, at least one further axis of the injection molding machine, for example the clamp unit and/or the ejector and/or the core pull or the core pulls and/or the carriage unit displacement, is controlled or limited. The injection molding machine is advantageously allocated a computer and a memory for set modulation, for the change of position of a resultant magnetic field and a corresponding control unit or the drive which is preferably designed as a synchronous motor. It has been found that in very many applications, the above-described open- and closed-loop control concepts may be applied individually or in particular combinations for other regions of the injection molding machine. In particular, it is proposed that at least one sensor be arranged on the displacement mechanics of the injection axis and/or on the closure axis and/or the ejection axis and/or on the carriage unit axis for determining the pressure for the injection molding and/or the force and/or the current of the respective driving motor. It is also proposed that at least one force and/or travel sensor be arranged in the region of the movement axes, for example the injection axis. The open-loop controller is preferably allocated at least one closed-loop controller for the superimposition of a pressure and/or force and/or position control, which are designed to be connected automatically at least when they reach predetermined limit values. However, it is particularly advantageous if all basic data in the form of recipes for the individual products are stored in a memory which is separate from the machine controller, for example in the form of a PC, and are transmitted to the machine controller as basic control data or as an entire recipe. The injection molding machine preferably has control electronics, the respective servomotor being controllable by the control electronics via a velocity input and a motor position feedback, or an input for the position or a position profile. The drive preferably has an electric servomotor (a brushless servomotor, for example of the "electronically commutated brushless motor" type, trademark "Fastact") or a controlled asynchronous motor (for example cage rotor) or a controlled directed current motor (DC-motor).

It is also possible to adopt the illustrated solutions according to the invention with diecasting machines, provided that the system with the incompressible metal melt is converted by application of a genuinely flexible or resilient element, for example a compression spring between the drive and the moving injection elements, to analog system behaviors as with injection molding machines.

The invention will now be described with further details with reference to some embodiments.

DETAILED DESCRIPTION OF THE INVENTION

Figure 1:
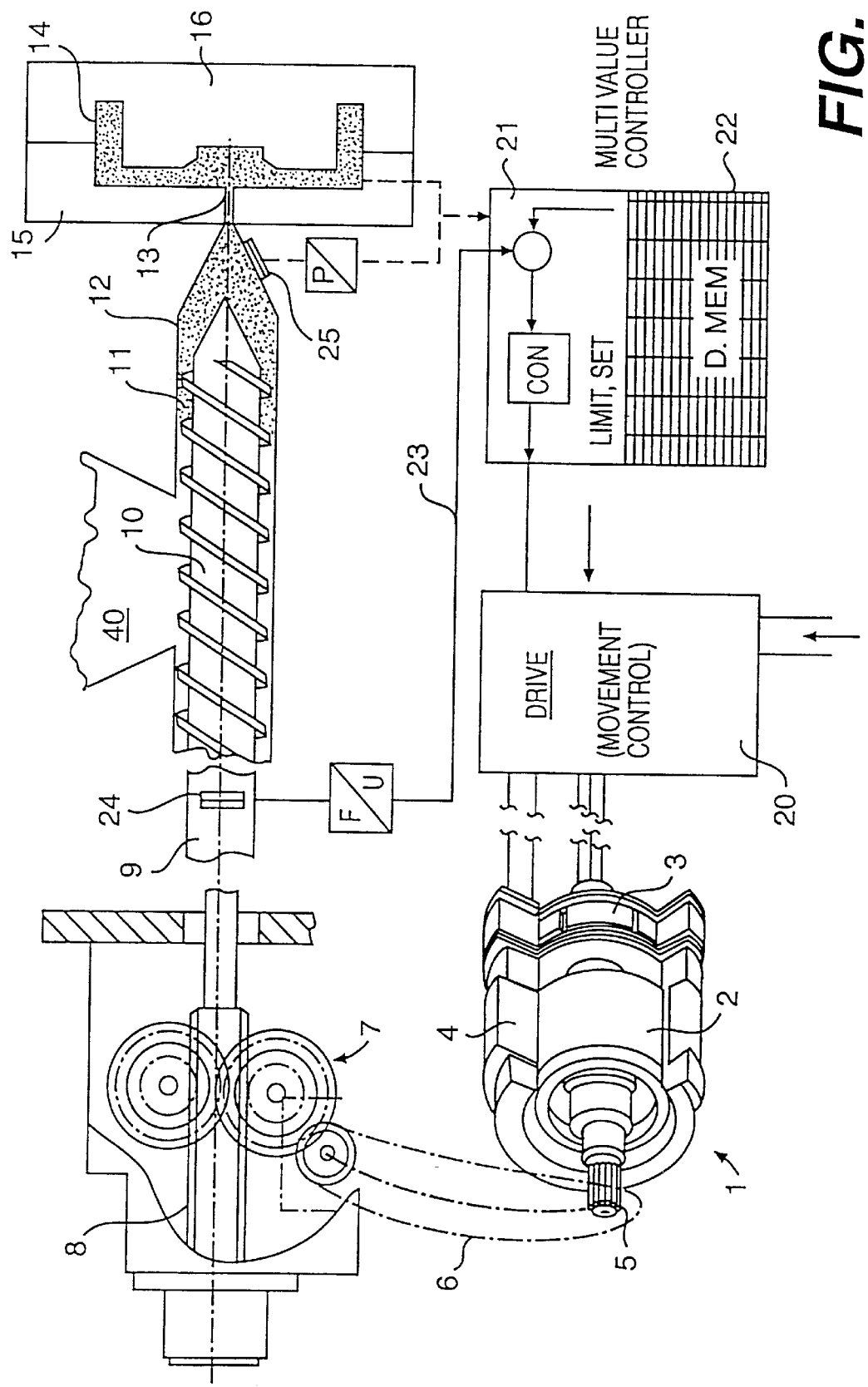
FIG. 1 shows schematically the central functional elements of the new invention of an injection molding machine.

Reference will be made hereinafter to FIG. 1. A driving motor 1 has a rotor 2 with permanent magnets and a position sensor 3. The stator 4 has a plurality of, usually three, windings as well as an inverter. Via an output pinion 5 rigidly keyed on the shaft of the rotor 2, an actual transmission gear 7 is driven via an overdrive 6 which is, for example, a toothed belt but preferably a gearwheel overdrive. The transmission gear 7 converts the rotational movement of the motor drive into a linear movement which is applied directly to a toothed rack 8. The toothed rack is connected by force to the screw shaft 9 so that the corresponding rotational movement of the rotor 2 is converted directly into a linear movement of the plasticizing screw 10 and performs the movement demanded by the injection molding process. The illustrated position of the plasticizing screw 10 in the injection cylinder 11 is roughly at the end of the filling phase so there is still a considerable quantity of injection material 12 in the injection cylinder 11 which is now pressed via the injection nozzle 13 into the cavity 14 in the two mold halves 15 and 16. The described sequence is carried out by a drive 20 via the control of the change of position of the resultant magnetic field or the corresponding control of the movement of the rotor 2 by a drive 20. All necessary control signals at the drives 20 are processed and supplied by an electronic controller 21 which is preferably arranged separately in terms of hardware. For this purpose, the electronic controller 21 has a data memory or recipe memory 22 by which a respective necessary basic recipe of the injection molding sequence modulates the course of movement, the set velocity, and pressure trace therefore being produced. The electronic controller 21 is preferably designed as a multiple value controller. An entire injection molding process can be controlled with the described basic functions. On the one hand, for novel, as yet unknown molds or materials, and also as protection during changes of material quality, it is advantageous to pick up additional process parameters continuously via appropriate sensors. Thus, it is very advantageous to detect the axial force in the screw shaft 9 during the entire injection process via a force sensor 24 and to transmit it via a signal line 23, which may be a bus transmission system, to the electronic controller so that, for example, a correction command can be delivered via the movement controller if limit values are exceeded. A further possibility is direct pressure detection via pressure sensor 25, this signal also being useful for movement control in the electronic controller 21.

Figure 2:
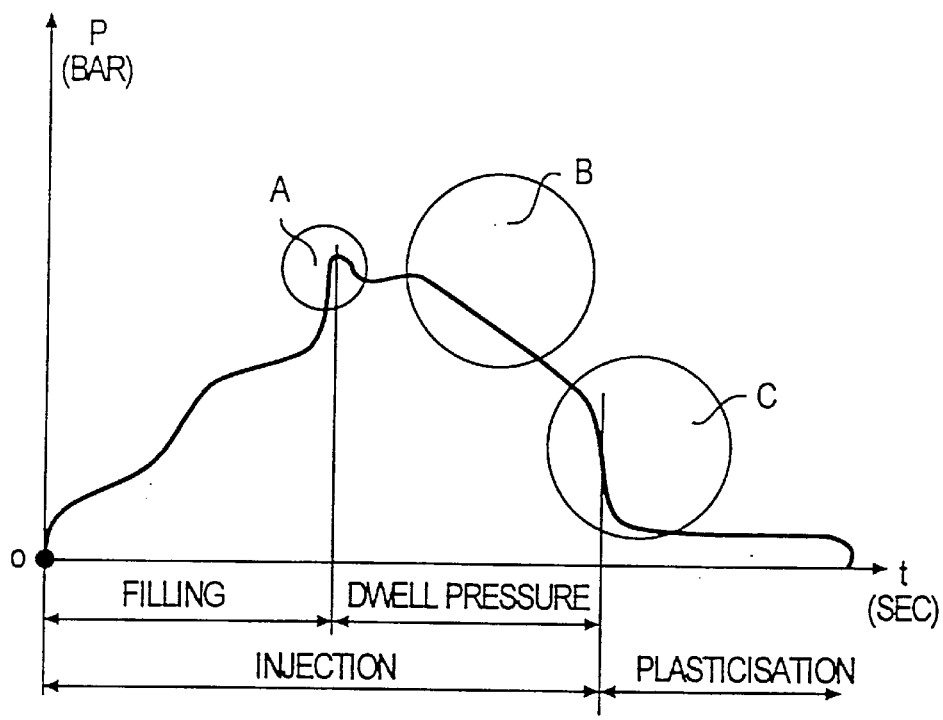
FIG. 2 is a simplified view of the basic pressure trace as a function of time.
Figure 2A:
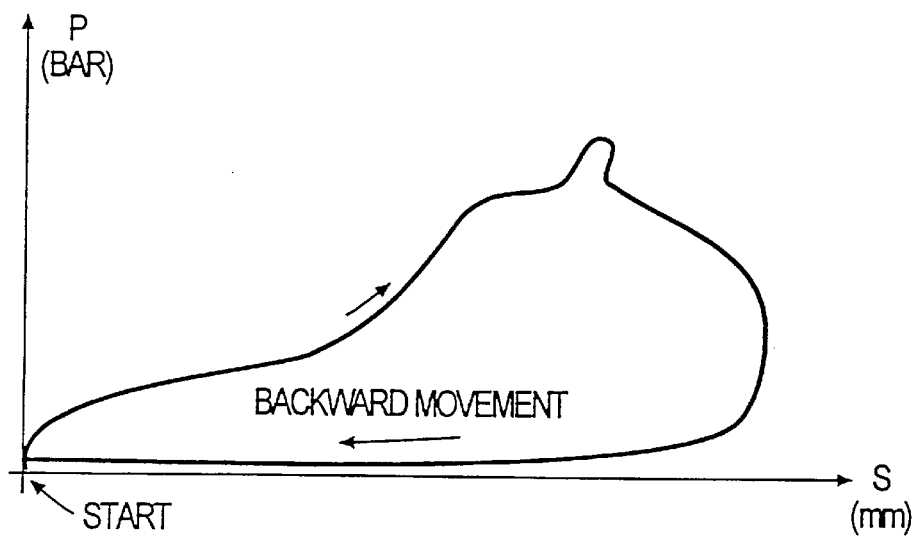
FIG. 2a is a corresponding simplified view of the pressure as a function of the screw position over an entire injection cycle.

FIG. 2 shows the pressure trace over an entire injection cycle. The critical transitions are marked in particular. A denotes the transition from the filling phase into the dwell pressure phase. B marks the transfer from the dwell pressure phase into the plasticisation phase and C the actual transition into plasticisation. FIG. 2a shows the pressure/travel function of the linear sequence of movement for the plasticizing screw 10. The movement begins with a start and ends at the same start and is therefore ready for the following cycle.

Figure 3:
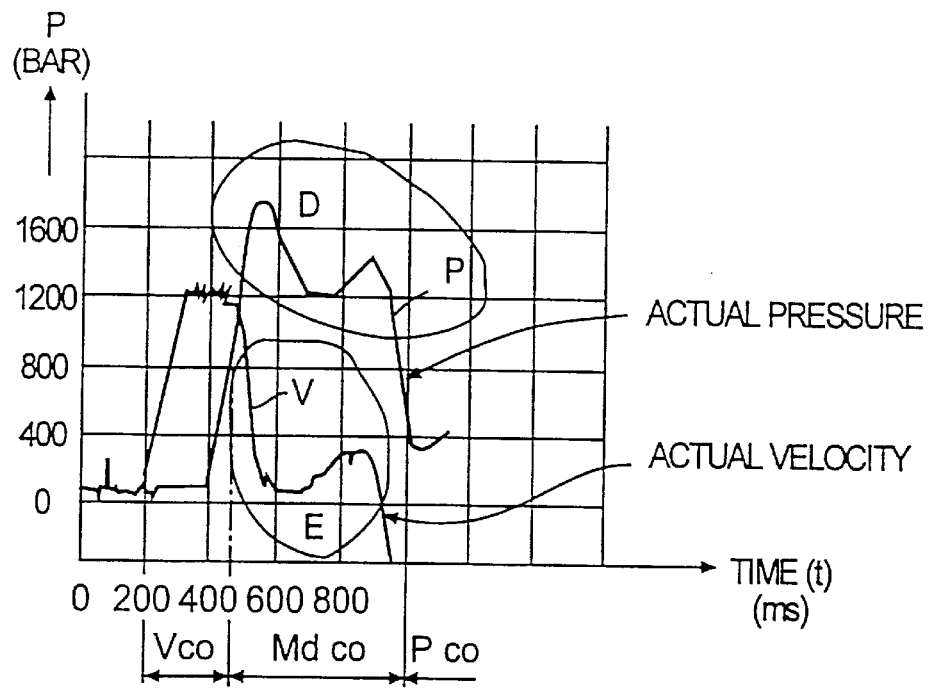
FIG. 3 shows the actual pressure or velocity trace according to the prior art.
Figure 3A:
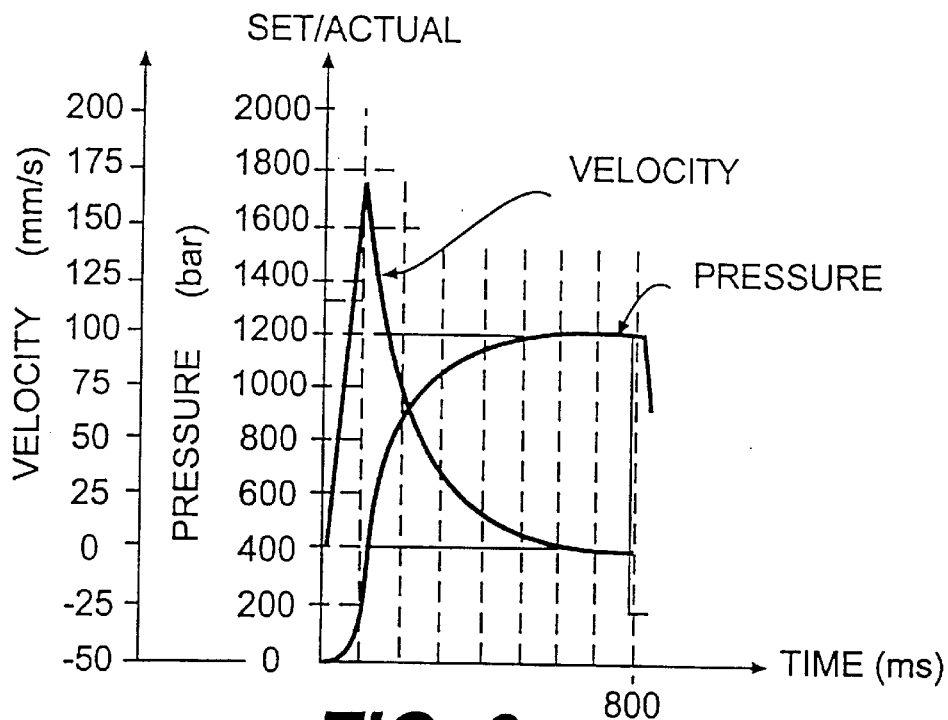
FIG. 3a shows a response to pressure set value step with a linear pressure controller.

FIG. 3 shows the oscillation behavior in the prior art. In the prior art, the first phase, the filling phase, is velocity controlled (Vco) and the second phase, the dwell pressure phase, is pressure or torque controlled (Mdco), the latter in the case of formerly known electric drives for injection molding machines. The filling phase which is uncritical as such produces good results via mere velocity control. On the other hand, a very disadvantageous oscillating movement with a half wavelength of about 200 milliseconds is formed in the dwell pressure region, as marked by the circle D for the pressure curve or E for the velocity curve. FIG. 3a shows typical measured curves for the pressure and the velocity. On the basis of a linear controller, a very disadvantageous exponential transient condition is produced during a step response value.

Figure 4:
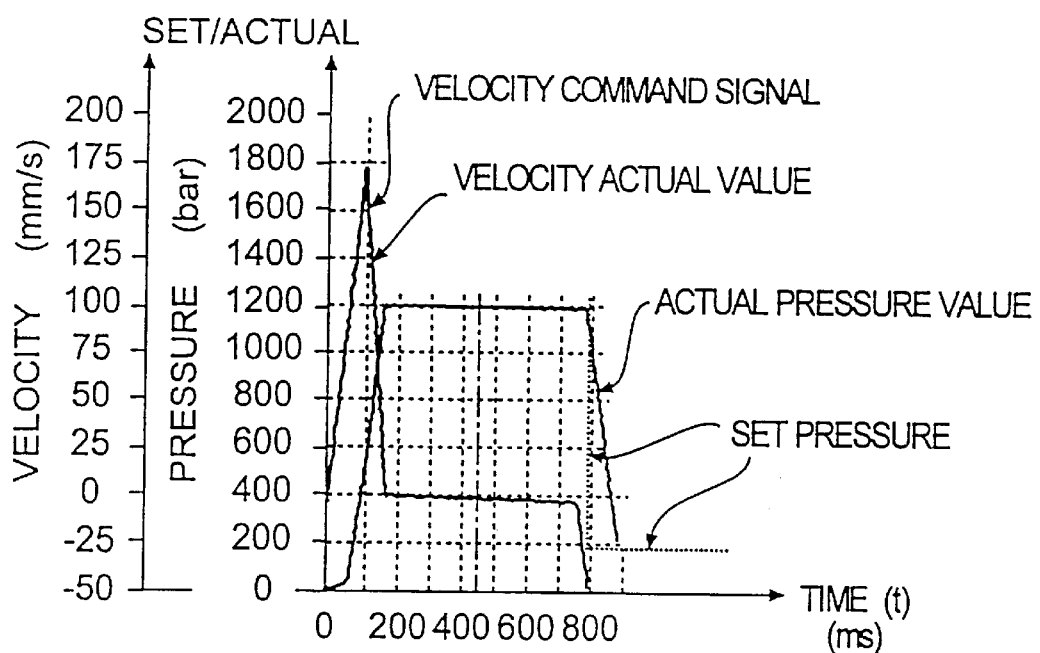
FIG. 4 shows the actual pressure or velocity trace measured on an injection molding machine equipped according to the invention.
Figure 4A:
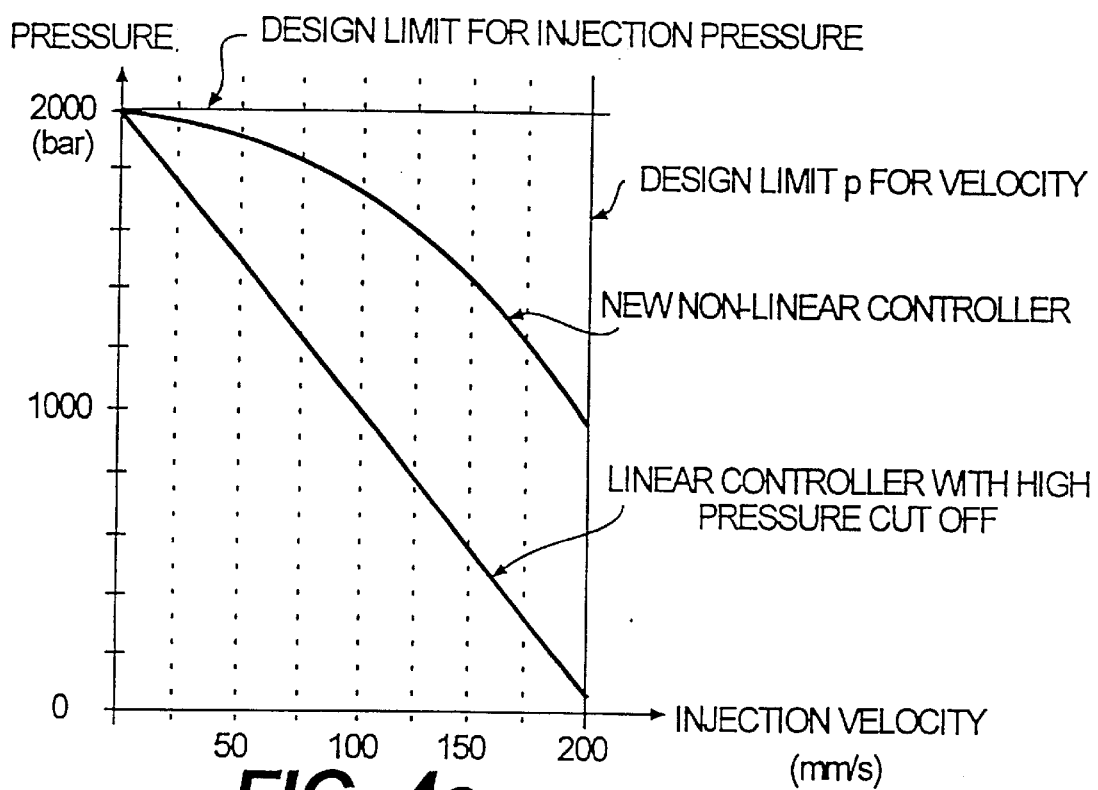
FIG. 4a shows a comparison between the static pressure-override characteristic with linear and non-linear controller.

On the other hand, FIG. 4 shows an example of the new invention. The actual value follows the predetermined set value in an almost ideal manner and produces a substantially linear velocity trace and very sharp transitions from one phase into the next. There is no oscillation movement at all. However, it was possible to illustrate not only the oscillation of about 2.5 Hertz inherent in the system, but also the central disadvantage of the prior art. In the prior art, the unacceptable interference values had to be attached as well as possible during the decisive phase of the injection process via many closed- or open-loop control corrections. FIG. 4 also shows clearly that during control of the movement, the existing oscillating movement is suppressed and high stability of both the pressure trace and the velocity trace is obtained. All experiments with the novel invention have shown that during control of the movement, the appropriate oscillations are not obtained and an ideal trace corresponding to the necessary target values function may be produced. An almost ideal linear trace of the actual velocity is obtained in the pressure step response. FIG. 4a shows a comparison of the static pressure/velocity characteristic. It can be seen very clearly that it is possible to run much closer to the design limit values with a novel non-linear controller.

Figure 5:
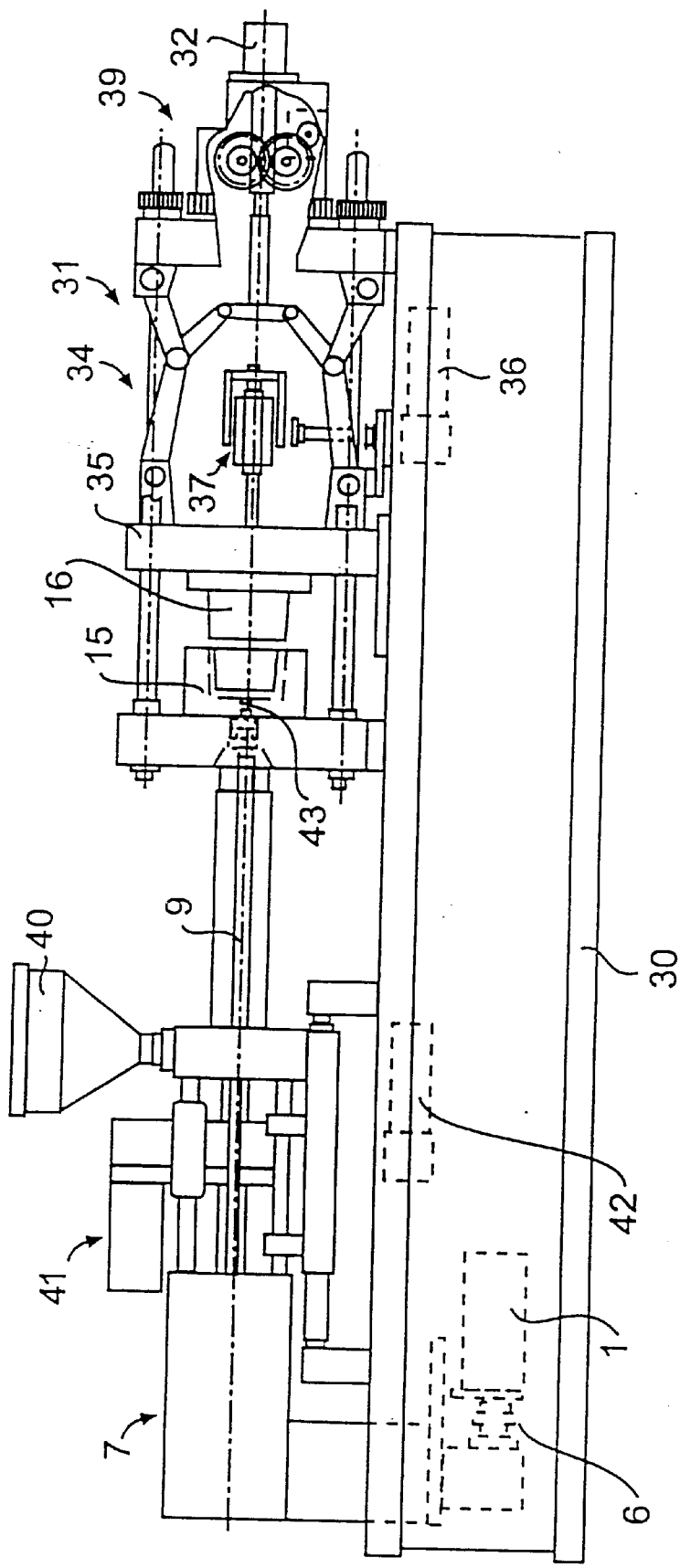
FIG. 5 shows a complete injection molding machine.

FIG. 5 shows an entire injection molding machine on a machine support 30 with a mold closing arrangement 31 which brings a movable base plate 35 with the mold half 16 before and after each one into the corresponding open- or closed-position via a rotor 32 and a transmission 33 and a double hinged joint 34. A further drive 36 actuates an ejector 37. The plastic raw material is supplied via a feed hopper 40. The rotational movement of the plasticizing screw 9 is produced by a driving motor 41 with corresponding overdrive. A further axis 42 is provided for driving the carriage unit. The feed nozzle is provided with reference numeral 43.

Figure 6:
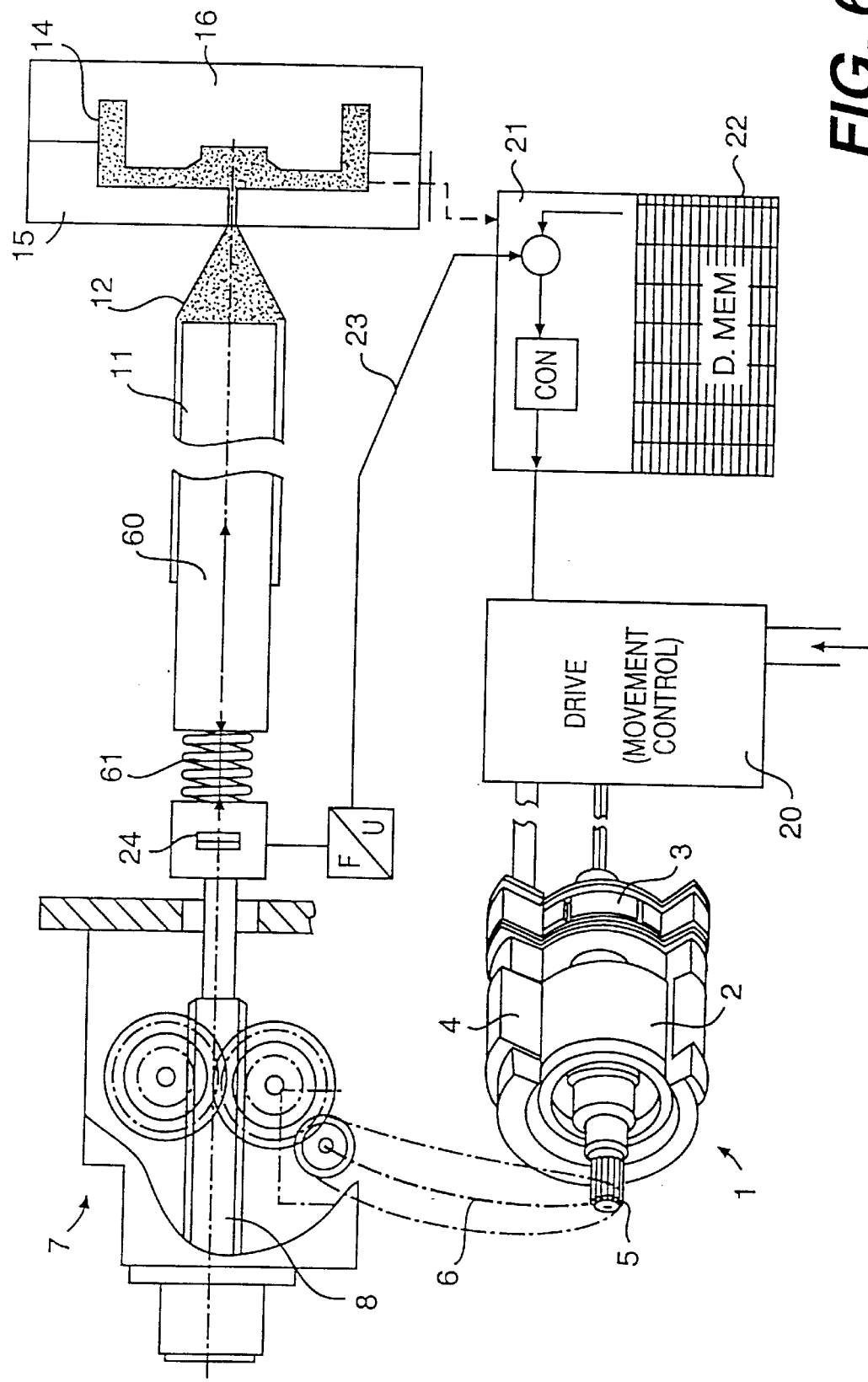
FIG. 6 shows the application of the invention in a diecasting machine.

FIG. 6 shows a similar construction to FIG. 1. The coinciding features are designated with the same reference numerals but this figure shows a diecasting machine. Metal basic materials such as aluminum etc. are processed using the diecasting machine. In contrast to the plastic material in injection molding machines, metal is almost incompressible, even in a liquid form. It has been found that, apart from the specific values of the individual recipes, the new invention can also be applied very advantageously in diecasting machines provided that a compression spring 61, which embodies the function of the resilient behavior of the plastic melt, is arranged purely constructionally between the drive 7 and an injection molding piston 60.

Figure 7:
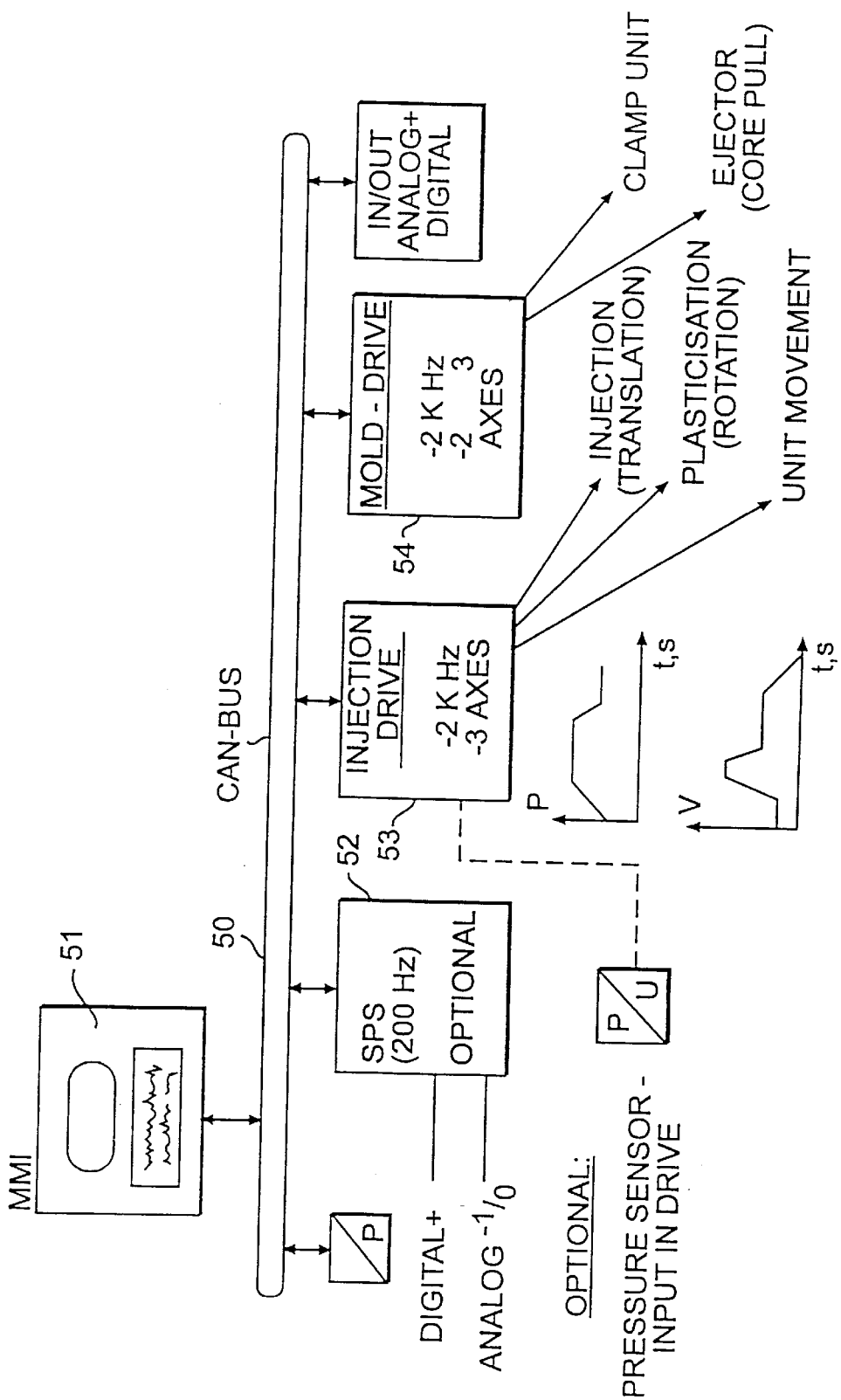
FIG. 7 shows schematically a complete control concept for the entire machine.

FIG. 7 shows a quite particularly advantageous design of an overall controller in which communication is carried out via a field bus 50. All programs can be deposited in a computer memory, for example in a PC51, and can be transcribed in a mold-specific or material-specific manner for the respective operating instruction or the production of a specific number of identical parts as recipes for example of a SPS 52, and all other sensor signals can optionally be coordinated from there via the field bus 50 or all operating signals can be delivered. In FIG. 7, two respective multiple axis drives 53, 54 are combined as a hardware unit. The injection drive 53 coordinates the three axes for injection (translation), plasticisation (rotation) and unit movement. Two or three axes are mentioned in the case of mold drive 54; clamp unit and the ejector (core pull). Other combinations are also possible.

Figure 8:
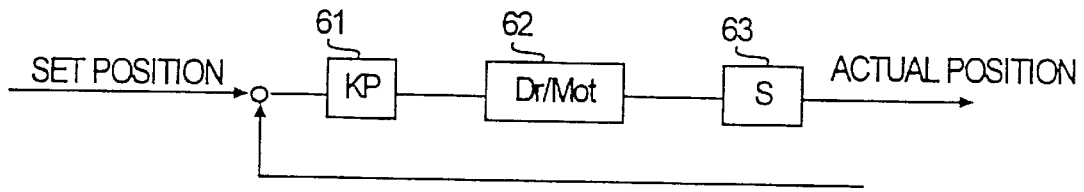
FIG. 8 shows conventional position control according to the prior art.
Figure 8A:
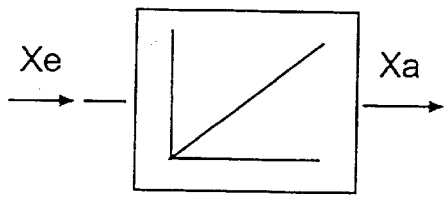
FIG. 8a shows the linear function, associated with FIG. 8.

FIG. 8 shows a conventional known position controller, with a linear control function in FIG. 8a.

61: Conventional (proportional) controller
62: Secondary drive/motor velocity controller
63: Mechanical integrator of the motor speed concerning position actual value. Conventional control engineering is based on linear behavior of the components (plant and associated controller). Building up the secondary velocity controller in the drive, the primary position controller is designed as linear feedback of the set/actual deviation.

Figure 9:
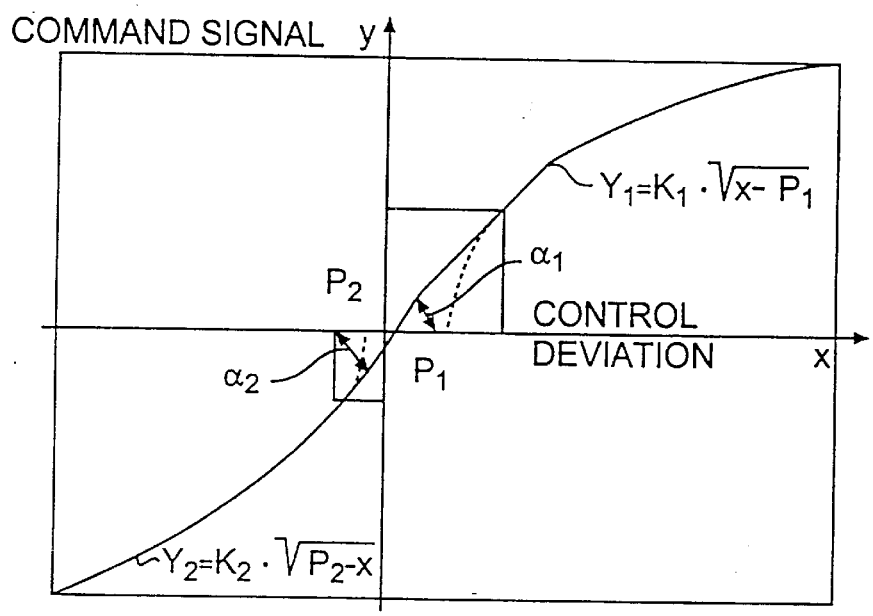
FIG. 9 shows an example of the invention with an optimized linear/parabolic function.

FIG. 9 shows the functional characteristic of a linear/parabolic controller. To prevent the high intensification in the small signal range from leading to instabilities, the parabola has been replaced by a conventional linear function in the region close to the set position. It has been found that a (time) optimum movement function can be obtained with position control in the large signal range with a parabolic dependency of the velocity on the set position difference. In other words, the set/actual deviations in the new controller act in a mainly parabolic manner on the velocity command signal and not merely linearly as with conventional controllers.

Figure 10:
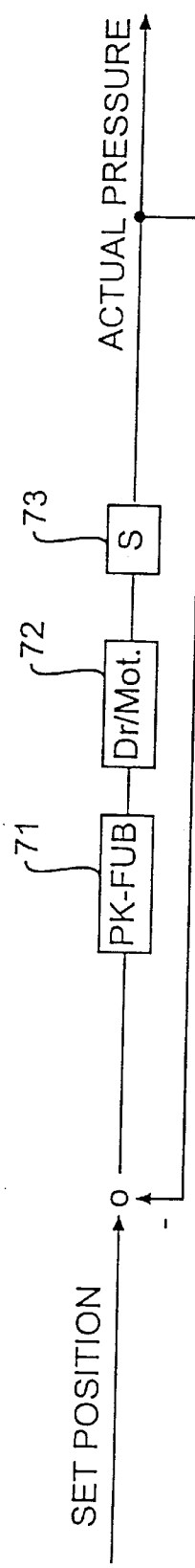
FIGS. 10, 10a and 10b show various developments of the invention with linear/parabolic controller.

FIG. 10 shows position control improved according to the invention in which:

71: Position control functional component;
72: Secondary drive/motor velocity controller; and
73: Mechanical integrator of the motor speed with regard to the position actual value.

Figure 10A:
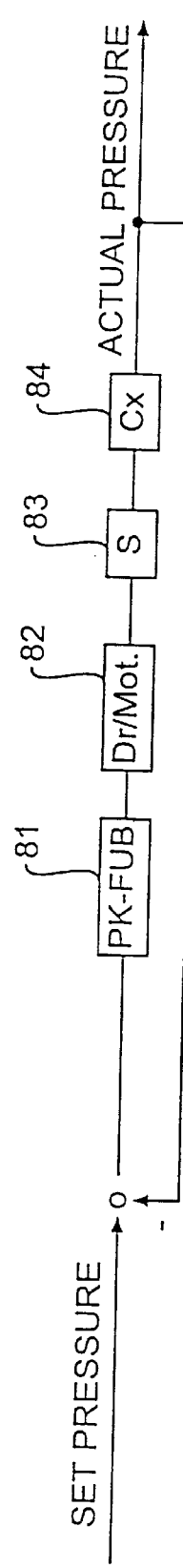

With the time-optimized or acceleration-optimized approach to the target, the position control functional component 71 also contains the input of the maximum acceleration and deceleration values as well as the value of the allowed and set speed of movement which may not be exceeded. FIG. 10a shows optimized pressure control in which:

81: Position control functional component;
82: Secondary drive/motor velocity controller;
83: Mechanical integrator of the motor speed with regard to position actual value; and
84: Static system pressure intensification (bar/m)

It has been found according to the invention, and can now also be proven mathematically under certain marginal conditions, that the same applies during pressure control if the set position signal is exchanged for the set pressure signal, and the actual signals accordingly. This is due to the fact that there is a direct linear connection between travel difference and corresponding pressure difference in the static case. With a 1,000 kN IMM, the static system pressure intensification is about 200 (bar/mm) in the leading screw region and decreases to about ⅓ of this value in the trailing region. To enable the same parameters to be used for position and pressure control, the pressure difference has to be adapted with a scale factor (Kp).

Generally speaking, both the pressure and the velocity are predetermined during the injection process. In the first phase, the priority often lies in velocity checking and later on, in pressure selection. Furthermore, the software of the injection controller has to ensure that the end positions are not traveled over, in other words may not be touched in normal cases. Travel into the mechanical limits should never take place at high velocity. The injection controller therefore has to meet the following requirements: Control of the predetermined (maximum) acceleration and deceleration Control of the (maximum) injection velocity=f(s,t)

Control of the (maximum) injection pressure=f(s,t)

Control of the (minimum/maximum) position—typical of the machine

Figure 10B:
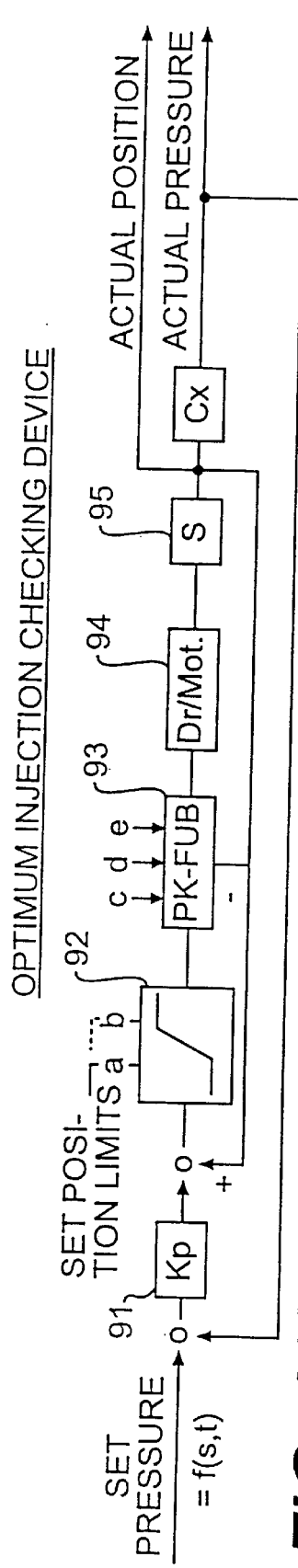

FIG. 10b shows an injection controller which is optimized at an even higher stage, in which:

91: Adaptation of pressure control intensification;

92: Position (overrun) limits;

93: Position checking functional component;

94: Secondary drive/motor velocity controller with secondary current controller;

95: Mechanical integrator of motor speed with regard to position actual value;

96: Static system pressure intensification (bar/m);

a: Maximum travel limit;

b: Minimum travel limit;

c: Set acceleration;

d: Set deceleration; and e: Set injection velocity=f(s,t).

The optimized injection controller may be further improved for specific tasks. Thus, particularly in the large signal range, the intensification Kp or Kz can be carried out unsymmetrically as further optimization in order to utilize the higher angular deceleration under load.

Furthermore, a partial) quadratic interference value application of the actual velocity or preferably of the mass flow from the feed nozzle 43 at the set pressure can also be selected in order further to optimize the pressure/velocity characteristic (pressure cutoff characteristic). Moreover, a non-linear connection between motor angle and screw position at the set value and during control parameter determination generally has to be taken into consideration.

According to a further very advantageous design, the mass flow (m) through the feed nozzle can be superimposed or applied by means of interference value application as a function of pressure control for maximum approximation of the injection pressure to the set value even at elevated injection rates. For example, the set pressure value can have an interference value application of the form:

$$K1 \times V2 - K2 \times P2.$$

K1, K2 denote dependent constants, V=screw feed velocity, and P=injection pressure gradient.

Figure 11:
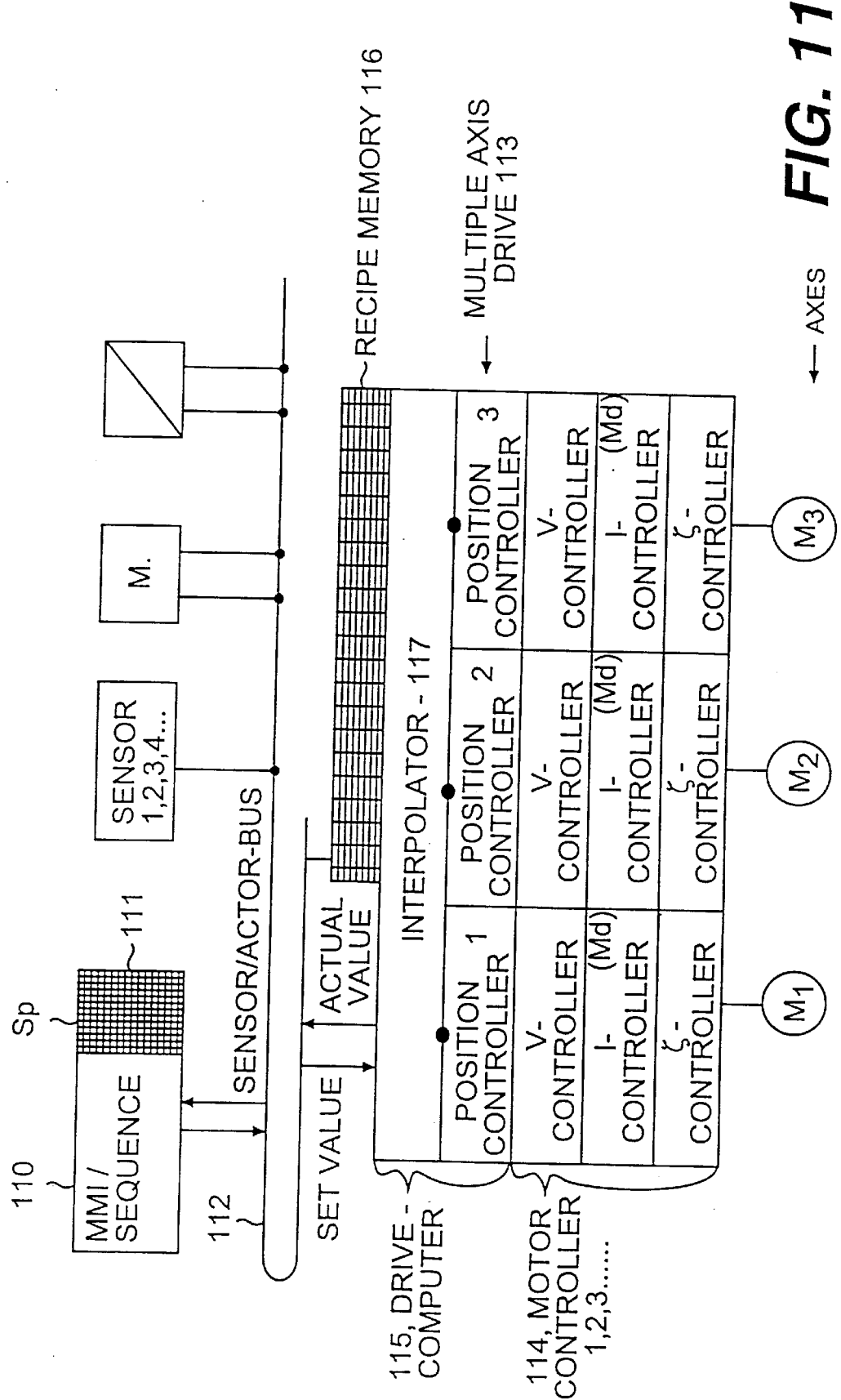
FIG. 11 is a simplified schematic view of a controller for three axes.

FIG. 11 shows an advantageous basic diagram which shows, in particular, the main functional elements for a multiple axis drive. FIG. 11 is at the same time also a corresponding detail from FIG. 7. A machine computer 110 with a computer data memory 111 is connected via a bus or a sensor/actor bus 112 to a multiple drive or multiple axis drive 113 consisting of three controllers 114 (114.1; 114.2; 114.3; etc.), a drive computer 115 with recipe memory 116. The drive computer 115 consists of an interpolator 117 and three position controllers 117.1; 117.2; 117.3, which form a functional unit guaranteeing the best possible and shortest possible coordination of all position controllers. Each controller 114 has a respective inherent velocity controller (V-controller) and a current controller (I-controller) which controls the torque as well as a field controller (φ-controller), and is connected in each case to an axis or the corresponding motor M1, M2, or M3. All necessary signal or control connections of the machine such as sensors, auxiliary motors, etc. can also be connected to the sensor/actor bus 112, for example according to FIG. 7. However, direct high velocity processing for all control tasks takes place directly in the multiple drive 113 on the basis of set value limit values or a corresponding recipe which is transmitted by the computer data memory 111 for each specific operation.

Figure 12:
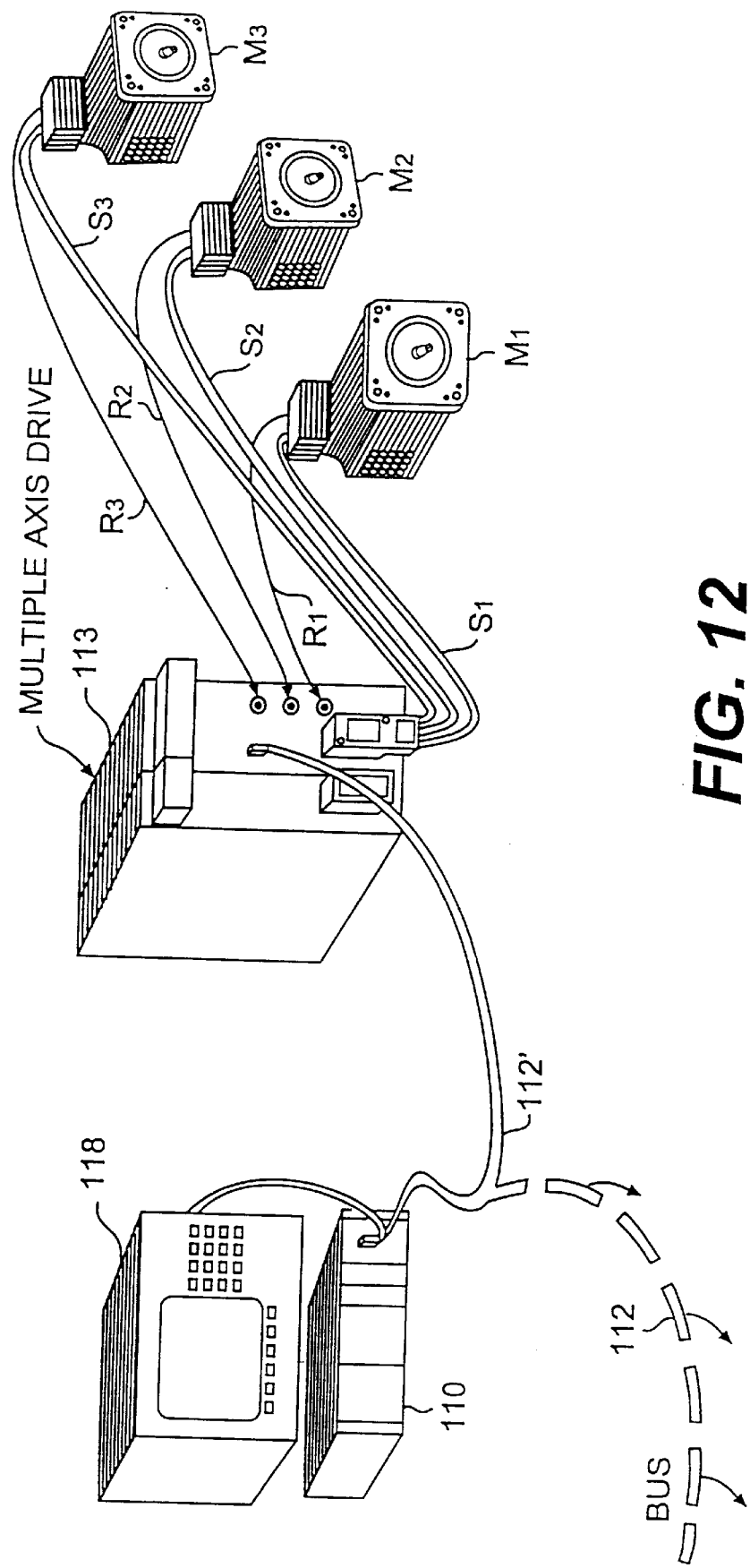
FIG. 12 is a figurative simplified view of the basic elements for an entire machine.

FIG. 12 is a very simplified view of a multiple drive or multiple axis drive with three axes (M1, M2, M3) according to the invention in terms of hardware. The core is the multiple axis drive 113 which is designed here for the simultaneously coordinated open- and closed-loop control of three axles or three motors (M1, M2, M3). Data can be transmitted via a direct line 112' or a data bus 112, as in FIG. 7 or FIG. 11, depending on the degree of development or complexity of the entire controller. Visualization takes place in a master device 118 of the machine controller or of the machine computer 110. Basic components on which the new solution is built up are the control connections (S1, S2, S3) with the respective motor M1, M2, M3 as well as the feedback connection R1, R2, R3 by means of which, in particular, the φ-controller or the position actual values of each axis are fed back or by means of which the corresponding internal control takes place. The multiple axis drive is open/closed loop motor control for several axes.

To sum up, the solutions according to the invention allow simple surveyable stable machine controllers to be designed building up on the actual control of the injection process as such, according to a particularly advantageous novel multi-value controller, in particular, the basic parameters of injection pressure, injection velocity and position control are controlled in a manner not possible hitherto.

The term multi-value controller covers, in particular but not exclusively, the control of an axis or of a drive with regard to several target values.

The multiple variable controller receives a spatial envelope limiting hood consisting of the three aforementioned basic parameters for each specific operating instruction as recipe. (On the other hand, the conventional controller is characterized by strict coupling of set and actual value, is always active and tends to cause the two to coincide). The multiple variable controller basically differs from it in part. As at least two or three set values or corresponding limit values are predetermined as target values, only one of the respective values is normally controlled or limited in the conventional sense while the other controller parts are inactive at the corresponding moment. In concrete terms, this means that, for example, an attainment of the maximum predetermined pressure (for example 2,000 bar), the corresponding pressure controller takes over the control command while the other two are inactive. The same applies for each of the other parameters. However, it is actually possible to optimize all basic parameters (pressure, velocity and travel) with the corresponding electric drives as, in the case of injection screw control, a velocity signal for the axial movement of the injection screw is selected for all three as a command signal.

This means, for example, for the three core regions, firstly a process for the injection molding of shaped parts by means of an injection molding machine in which
  a) the injection screw is moved axially by means of an electric motor and an adjoining transmission gear and
  b) process parameters are subject to closed- or open-loop control wherein
  c) a velocity signal for the axial movement of the injection screw is selected as command signal during the closed/open loop control, including limitation of the pressure exerted on the injection molding composition.

Furthermore, a second process for the injection molding of shaped parts by means of an injection molding machine in which
  a) the injection screw is moved axially by means of an electric motor and an adjoining transmission gear, and
  b) process parameters are subjected to closed or open loop control, wherein
  c) a velocity signal is selected as command signal during the closed/open loop control, including limitation of the injection screw travel.

Moreover, a third process after the first or second process in which a velocity signal for the axial movement of the injection screw is selected as command signal for the closed/open loop control, including limitation of the axial velocity of the injection screw.

Fourthly, from the group of process parameters, the pressure exerted on the injection molding composition, the axial velocity of the injection screw, and the travel of the injection screw, it is possible to subject to closed/open loop control those respective process parameters which reach limit values or bandwidths. The limit values or bandwidths of the process parameters can be predetermined as functions of time and/or travel. Similarly, the same "guide philosophy" can be adopted, at least in part during closure of the mold.

The machine as a whole, for example the injection process as well as mold closure, can be controlled with a novel uniform open- or closed-loop control philosophy which simplifies control of the entire processing sequence and, in particular, allows extremely great flexibility with top quality results. Moreover, the particularly critical phases or regions of the process can be controlled with stability and reproducibility of the production sequence not attained hitherto, within a very short total cycle time. The combination of multiple variable control and multiple axis drive is also particularly advantageous.

According to a further embodiment, it is also possible to integrate the velocity setting signal and to transmit it as a position setting signal (optionally in the form of position signals) to the control electronics (drive with integrated velocity and position controller).

What is claimed is:

1. A method of controlling an injection molding machine having a filling phase, a dwell phase, and a plasticization phase, the injection molding machine having an injection screw drivable for axial movement within an extrusion cylinder by a drive-controlled servo motor through a mechanical transmission, the servo motor having a velocity command signal input connection different from a torque command signal input connection, means for sensing at least one of screw position, and injection pressure, the method comprising the steps of:
  presetting desired values for said at least one of the injection pressure and the screw position;
  sensing the respective one of the corresponding actual injection pressure and actual screw position; and
  transmitting non-zero velocity command signals to said drive-controlled servo motor during at least the plasticization phase to move the injection screw within the cylinder, said velocity command signals being calculated as a function of a deviation of the respective one of the actual injection pressure and the actual screw position from said respective preset desired value for said at least one of the injection pressure and the screw position.

2. The method as in claim 1 including the step of transmitting non-zero velocity command signals during the filling and dwell phases.

3. The method of claim 1 further including the step of providing maximum motor acceleration and deceleration values, and the step of modifying the transmitted velocity command signals by said maximum values.

4. The method of claim 1 further including the step of providing screw position limits, and the step of modifying the transmitted velocity command signal by said limits.

5. A method of controlling an injection molding machine having a filling phase, a dwell phase, and a plasticization phase, the injection molding machine having an injection screw drivable for axial movement within an extrusion cylinder by a drive-controlled electric motor through a mechanical transmission, the electric motor having a velocity command signal input connection different from a torque command signal input connection, means for sensing at least one of screw position and injection pressure, the method comprising the steps of:
  presetting a desired value for said at least one of the screw position and the injection pressure;
  sensing the respective one of the actual screw position and the actual injection pressure; and
  transmitting non-zero velocity command signals to said drive-controlled electric motor during at least one of said filling, dwell, and plasticization phases to move the injection screw within the cylinder, said velocity command signals being calculated as a function of a deviation of the respective one of the actual injection pressure and the actual screw position from said respective preset desired values for said at least one of the screw position and the injection pressure,
  wherein said velocity command signals comprise large and small signal ranges, and wherein in the large signal range said velocity command signal is calculated as a non-linear function of said deviation.

6. The method as in claim 5 wherein said non-linear function is calculated by a respective one of the equations $$\sqrt{|(P_{desired} - P_{actual})|} \times kp = \pm S_{tg}$$

and $$\sqrt{|(S_{desired} - S_{actual})|} \times ks = \pm S_{tg},$$

wherein $P_{desired}$ is the desired injection pressure, $P_{actual}$ is the actual injection pressure, kp is a pressure amplification factor, $S_{desired}$ is the desired screw position, $S_{actual}$ is the actual screw position, ks is a position amplification factor, and $S_{tg}$ is the transmitted velocity command signal.

7. The method according to claim 5, wherein in the small signal range, said velocity command signal transmitted to said drive-controlled motor is calculated as a linear function of said deviation.

8. The method according to claim 5, wherein said electric motor is one of a permanently excited servomotor, controlled asynchronous motor, squirrel cage motor, and a controlled direct current motor.

9. The method of claim 6 wherein in the large signal range the value of the respective one of the amplification factor is different during motor acceleration and deceleration.

10. The method as in claim 5 including the step of transmitting non-zero velocity command signals during the filling and dwell phases.

* * * * *